United States Patent [19]

Cretors et al.

[11] Patent Number: 5,662,024
[45] Date of Patent: Sep. 2, 1997

[54] SOLID STATE CONTROLLED POPCORN MACHINE

[75] Inventors: Charles D. Cretors, Lake Forest; Jeffery Taylor, Downers Grove, both of Ill.

[73] Assignee: C. Cretors & Company, Chicago, Ill.

[21] Appl. No.: 644,539

[22] Filed: May 10, 1996

[51] Int. Cl.$^6$ .................................................... A23L 1/18
[52] U.S. Cl. .......................................... 99/323.7; 99/323.9
[58] Field of Search ............................... 99/323.4–323.11, 99/483, 486, 330; 219/420–422, 512, 494, 508; 426/450, 233

[56] References Cited

U.S. PATENT DOCUMENTS

| | | |
|---|---|---|
| 2,549,449 | 4/1951 | Gibson . |
| 2,586,347 | 2/1952 | Kloster . |
| 2,654,823 | 10/1953 | Altemiller . |
| 2,907,264 | 10/1959 | Bashway . |
| 3,095,326 | 6/1963 | Green et al. . |
| 3,739,953 | 6/1973 | Cretors ................................ 99/323.5 X |
| 4,206,695 | 6/1980 | Cretors ................................ 99/323.9 |
| 4,288,686 | 9/1981 | Cretors ................................ 99/323.5 X |
| 5,033,363 | 7/1991 | King et al. ............................ 99/323.7 |
| 5,035,173 | 7/1991 | Stein et al. ........................... 99/323.7 |
| 5,301,601 | 4/1994 | Cretors ................................ 99/323.5 |
| 5,397,219 | 3/1995 | Cretors . |

*Primary Examiner*—Timothy F. Simone
*Attorney, Agent, or Firm*—Mayer, Brown & Platt

[57] ABSTRACT

What is disclosed is a microprocessor controlled popcorn machine. The processor is programmed with an auto cycle to insure the correct popping of popcorn. The popcorn machine has a kettle with a heating element for holding unpopped corn. An agitator for stirring the corn in the kettle is suspended in the kettle. An oil pump injects oil into the kettle. The processor controls all the operations of the popcorn machine. The popcorn machine has a control panel by which the user may activate the processor auto cycle program to begin the popping of corn. The processor controls the kettle heat through the kettle heating element. The processor also controls the oil pump to inject oil in the heated kettle to pop the corn. The processor controls the agitator to stir the kernels. The processor also controls the injection of oil and monitors the temperature of the kettle to insure that it does not exceed a regulation temperature.

15 Claims, 4 Drawing Sheets

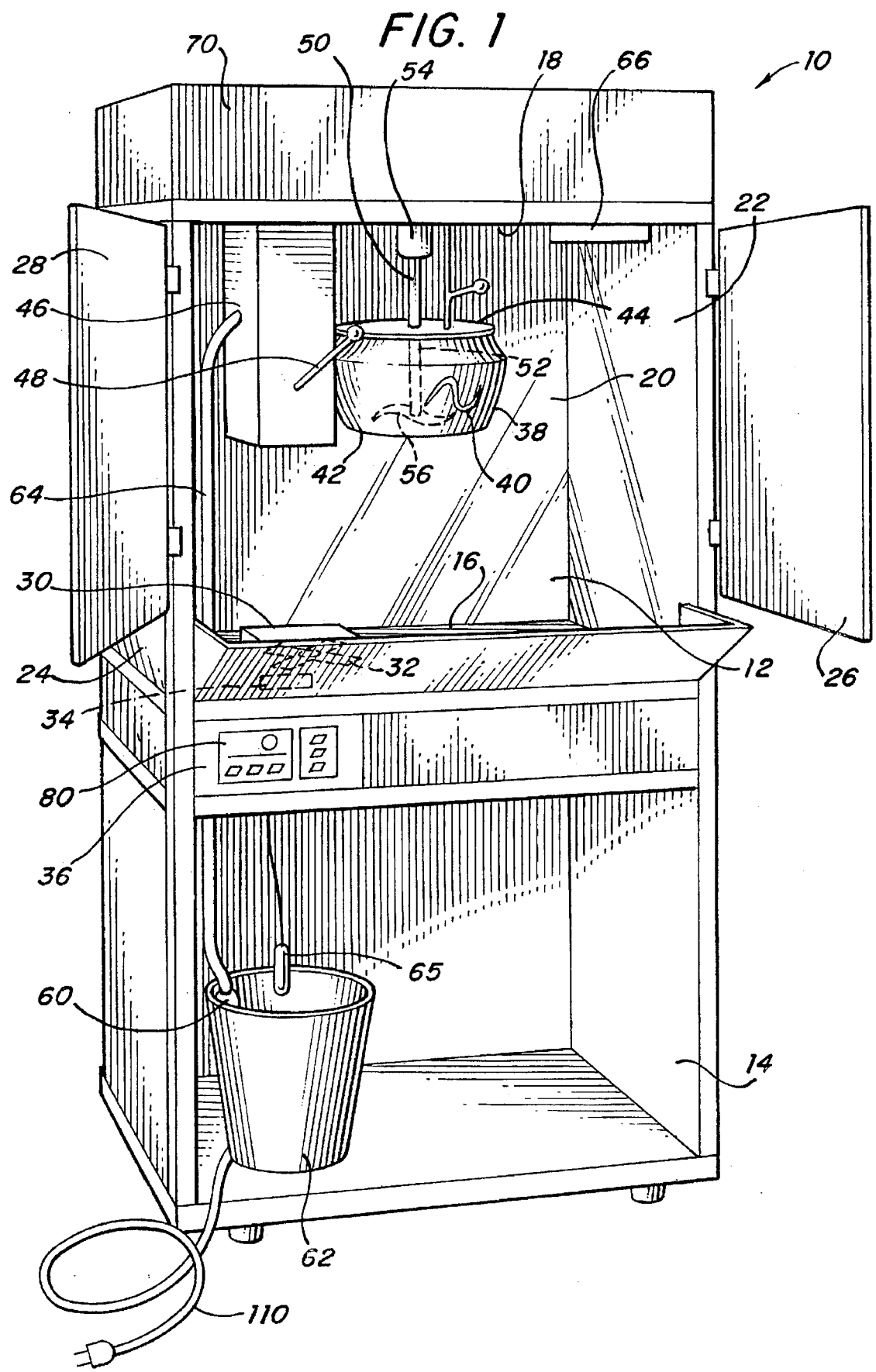

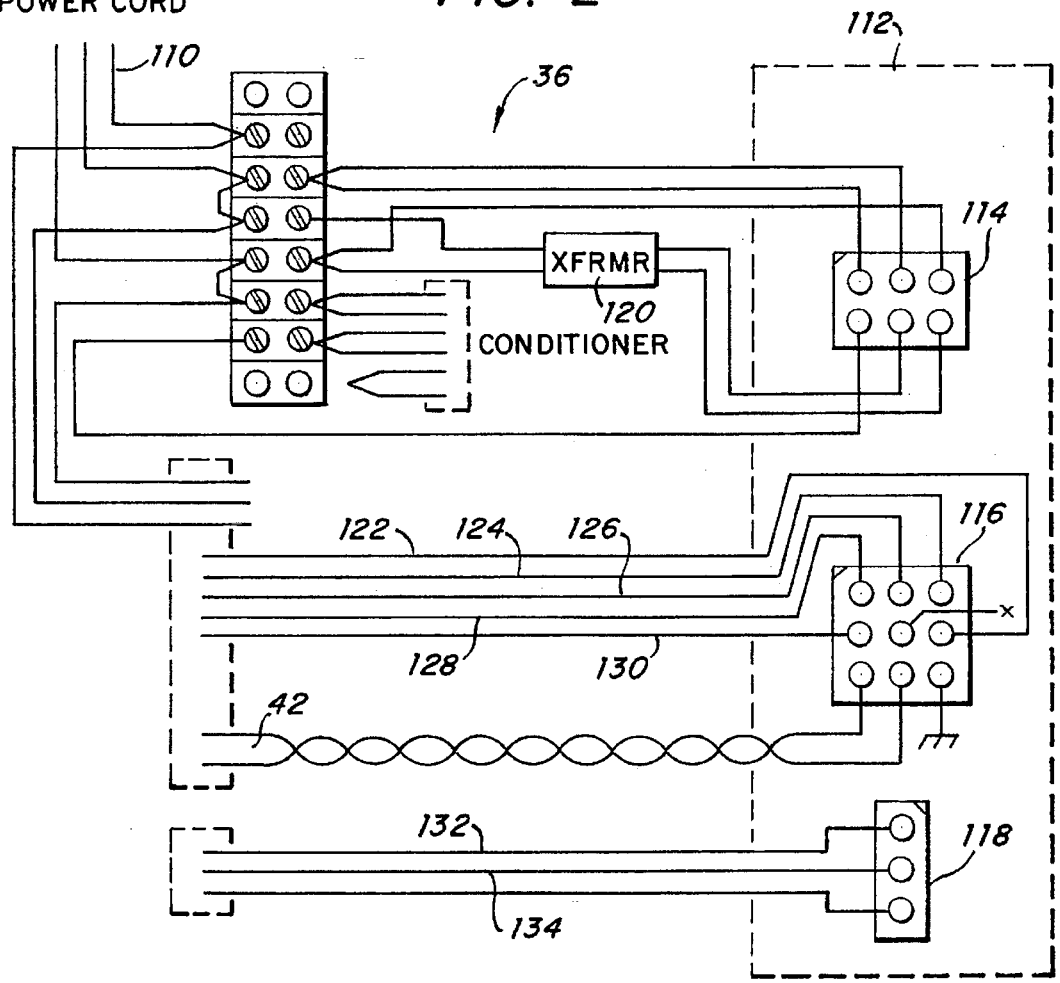
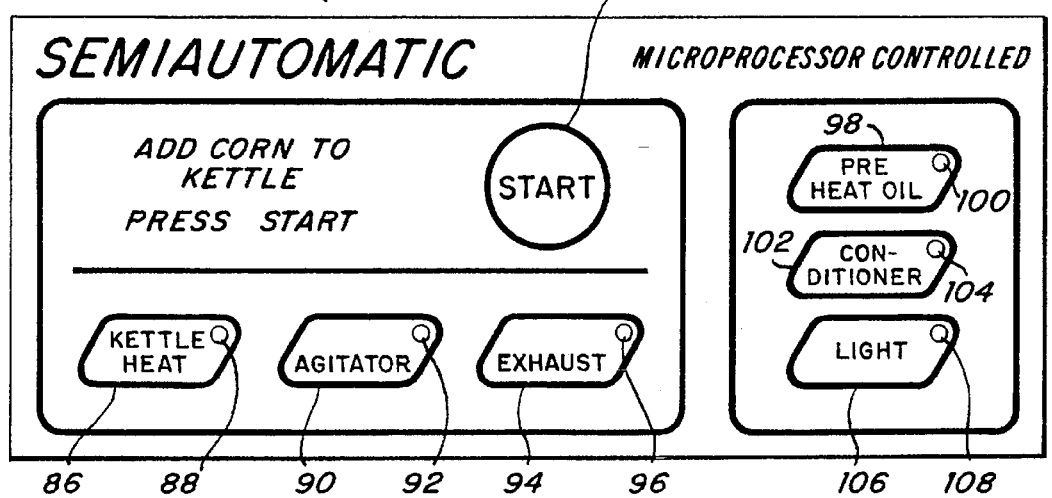

SOLID STATE CONTROLLED POPCORN MACHINE

FIELD OF INVENTION

This invention relates to machines used for preparing popcorn and more specifically, to a popcorn machine which uses a solid state controller to control the popping operation.

BACKGROUND OF INVENTION

Popcorn popping machines for concession stand, restaurant or home use are well known. Generally, such popping machines have a cabinet or case in which the popcorn is both cooked and stored. The unpopped corn (kernels) are typically loaded into a kettle suspended from the top of the popcorn case, combined with cooking oil and heated. The kettle has electrical heating elements to heat the oil and corn kernels and thereby effect popping of the kernels. As the popcorn fills the kettle, an initial portion of the popcorn discharges into the popcorn case and the remainder is subsequently dumped. An exhaust blower is used to vent the interior of the case. The oil is typically stored in a solid form and liquified by a heating element prior to the time the oil is needed.

In popcorn machines known presently, the various parts of the machine such as oil injection, kettle heating and exhaust systems are activated manually. Thus, a user must correctly add popcorn, oil, activate the kettle heat, and turn off the kettle heat when use of the apparatus is no longer desired. Previously, thermostats have been used to control kettle heat at an operating temperature of around 500° F. and to prevent the cooking kettle from reaching unacceptably high temperatures. Further, with manual operations the user is subject to injury from any direct contact with hot oil, kettle or heating elements.

In order to reduce the possibility of user injury and to achieve consistently reproducible corn popping the present invention provides an operation system in combination with a popcorn machine including a case for holding popped corn kernels, an electrically heated popcorn kettle located within the case, a corn agitator positioned within the kettle to stir corn during heating, means for exhausting air from the case and an oil pump operably connected to a source of popping oil to supply oil to the popcorn kettle. The machine operation system includes electrical circuitry for connecting the kettle, agitator, exhaust means and oil pump to a source of electricity. The machine system also includes a microprocessor operably connected to the electrical circuitry to programmable control operation of the kettle, agitator, exhaust means and oil pump during a cooking cycle.

This invention contemplates other features and advantages which will become more fully apparent from the following detailed description taken in conjunction with the accompanying drawings.

BRIEF DESCRIPTION OF DRAWINGS

FIG. 1 is a perspective view of the operator's side of a popcorn machine according to the present invention.

FIG. 2 is a block diagram of the control unit according to the present invention.

FIG. 3 is a view of the control panel for the popcorn machine according to the present invention.

DESCRIPTION OF THE PREFERRED EMBODIMENT

Figure 4A:
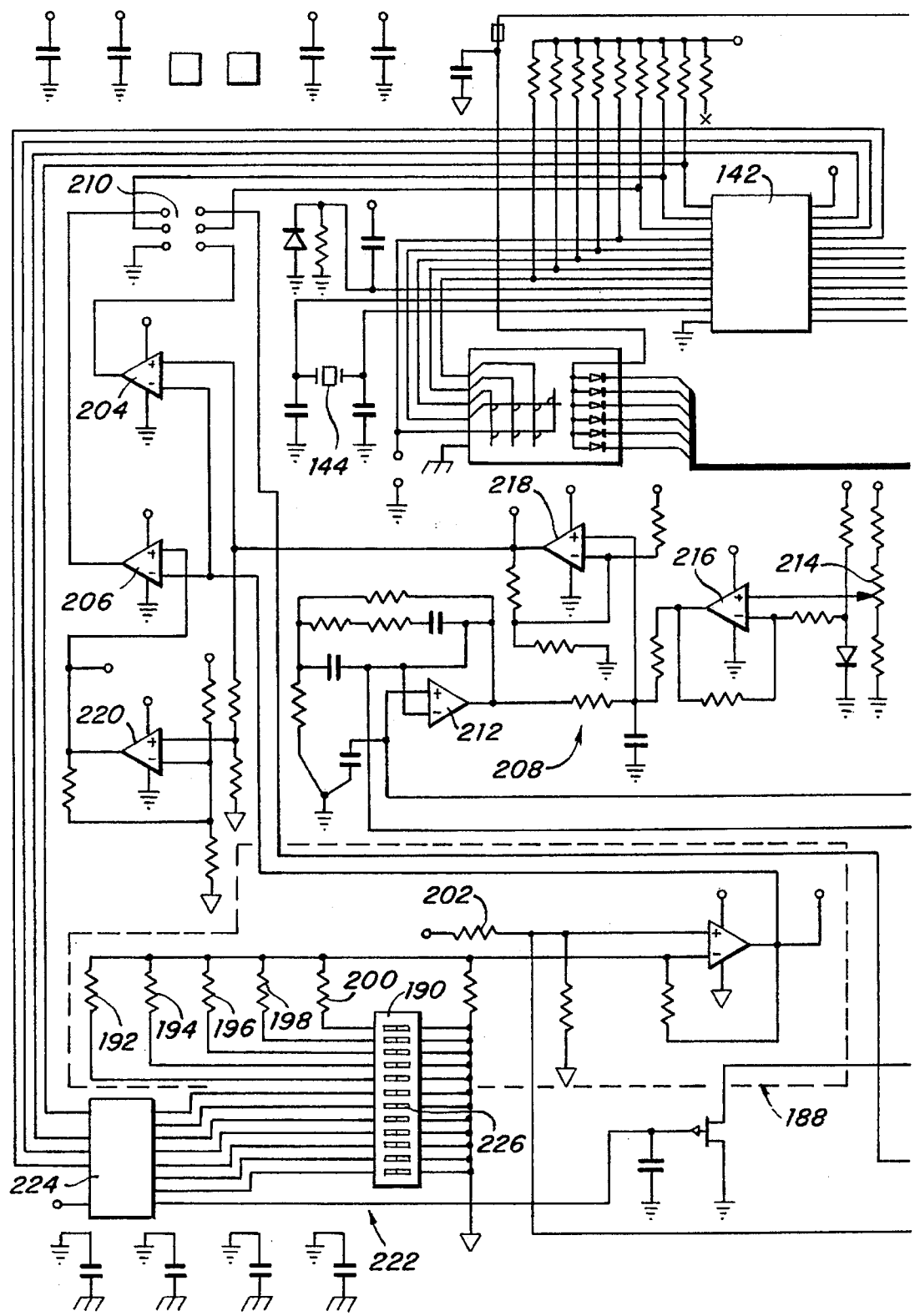
FIG. 4 is a circuit diagram of the control circuit according to the present invention.

The present popcorn machine includes as functioning elements: an electrically heated cooking vessel, means for storing kernels during cooking, means for keeping the popped corn warm, means for heating oil and injecting oil into the cooking vessel, an exhaust means, and a controller. The controller, which is used to effect largely automatic and safe operation of the machine, has a processor which is programmed to operate the machine functioning elements to control the popcorn popping sequence in a safe and efficient manner.

FIG. 1 shows a perspective view of the operator side view of a popcorn making machine 10 which can incorporate an operating control system according to the present invention. Popcorn machines are generally stand alone units which are used for the intermittent to continuous production of popcorn. These machines are capable of being operator controlled to produce quantities of popcorn varying according to demand. The popcorn machine 10 includes a popcorn case or cabinet 12 within which popcorn is both produced and stored. Popcorn machine 10 also includes a storage section 14 which may be used to store supplies such as extra popping kernels, oil, containers and the like.

The popcorn case 12 has a flat bottom shelf 16, a flat top wall 18 and is enclosed by a front panel 20 and a pair of side walls 22 and 24. The front panel 20 and the side walls 22 and 24 are typically made of plexiglass or other clear plastic to allow a view of the popping process, as well as the completed popcorn which is stored in the popcorn case 12. Access to the popcorn case 12 is provided by means of a pair of hinged doors 26 and 28, which are also made of plexiglass, to permit the operator to carry out cooking operations and to dispense popcorn when desired.

Popcorn case 12 has a hot air recirculating conditioner 30 mounted under the bottom shelf 16 and between the popcorn case 12 and the storage section 14. The conditioner 30 includes a blower 32 and a heating element 34 which operate in conjunction to force hot air through the popped corn in the popcorn case 12 to keep it warm until it is ready to be served. A control unit 36 is also mounted under the bottom shelf 16 and between the popcorn case 12 and the storage section 14.

The popcorn kernels are placed into a kettle 38 which is suspended from the top wall 18 of case 12. Kettle 38 is constructed of stainless steel and has heating elements 40 located in its walls. The heating elements 40, when activated, are utilized to heat oil contained within the kettle 38 and to pop the kernels of corn placed into the kettle 38 by the operator. A thermocouple 42 is located on the kettle 38 to sense the temperature of the kettle 38. Thermocouple 42 is connected to the control unit 36.

Kettle 38 is supported on a pivot axis (not shown) carried within support column 46 extending from the top wall 18 of the popcorn case 12. A kettle dump handle 48 which is connected to the pivot axis of the kettle 38, so that by rotating the dump handle 48, the kettle 38 may be tipped on the pivot to allow popped popcorn to be discharged from kettle 38 into popcorn case 12.

Kettle 38 has a cover 44 which is circular in shape and is suspended by means of a support rod 50 which extends through the center of cover 44. The support rod 50 encloses a drive shaft 52 which is connected to a motor 54 on one end and is connected at the other end to an agitator 56 having a number of mixing blades. The agitator 56 is rotated by the motor 54 to agitate the kernels in the kettle 38. The kettle cover 44 may be opened via a cover lift rod 58 to add kernels.

An oil pump 60 is operably positioned in an oil container 62 which is located within the storage section 14. The oil pump 60 draws oil from the oil container 62 through a tube 64 which allows the oil to flow into the kettle 38. Typically, the oil is initially in solid form in container 62 and is liquified by a heating element 65 which is inserted into the solid oil to melt the solid oil. After the oil is liquified, element 65 is operated for about 30 minutes prior to initiation of popping operations, the oil pump 60 is inserted into the oil container 62 and can then be used to inject oil into the kettle 38 via the tube 64, as desired. When the oil has been completely consumed, the entire oil container 62 may be replaced by a new container of oil.

An exhaust blower 66 is mounted on the top wall 18 of the popcorn case 12 for venting the interior thereof. A charcoal filter 68 is included as part of the exhaust blower 66 which serves to vent the popcorn case 12. Thus any undesirable odors may be reduced and airborne oils eliminated from the area around the popcorn machine. The exhaust blower 66 is coupled to and controlled by control unit 36. A light 70 is mounted in the top wall 18 to illuminate the popcorn case 12. The user may initiate the operation of the popcorn machine 12 via a control panel 80 which is mounted below the hinged doors 26 and 28. A power cord 110 is connected to the control unit 36 to provide the popcorn machine 12 with the necessary electrical power to operate the various components. The power cord 110 is a conventional three line power line which may be plugged into a normal 120 volt power source.

All of the machine elements described above are operatively interconnected and functionally controlled by the control unit 36 as shown in FIG. 2. The control unit 36 is activated by button mounted in control panel 80 and the buttons are each lighted during the time in which each respective operation is functioning.

Referring to FIG. 2, there is shown a block diagram of the control unit 36 according to the present invention. The control unit 36 has a printed circuit board 112 having a 6 pin socket 114, a 3 pin socket 116 and a 9 pin socket 118. Each of the pins of the sockets 114, 116 and 118 serve as output and input interfaces to the electrical components on the circuit board 112. Two pins of the 6 pin socket 114 are connected to the power cord 110 via a transformer 120 to create a 12 volt AC source. Three pins of the 6 pin socket 114 are connected directly to the 120 volt power leads from the power cord 110. The conditioner blower 32 and heating element 34 are coupled to the last pin of the 6 pin socket 114.

The 9 pin socket 116 has two pins connected to the thermocouple 42. Three pins of the 9 pin socket 116 are coupled to an exhaust power line 122, an agitator power line 124, and a kettle heat power line 122 respectively. The exhaust power line 122 powers and activates the exhaust blower 66. The kettle heat line 122 powers the heating elements 40 of the kettle 38 causing the kettle 38 to be heated.

Two pins of the 9 pin socket 116 are connected to a light power line 128 and a thermostat line 130 respectively. When the light line 108 is activated, power is sent to the light 70. The 3 pin socket 118 is connected to an oil pump power line 132 and a preheat oil power line 134. When the oil pump line 132 is activated, the oil pump 60 is powered and injects oil from the reservoir 62 into the kettle 38. When the preheat oil line 134 is activated, the heating rod 65 in the oil container 62 heats the solid oil.

FIG. 3 is a front elevation showing the control panel 80. The control panel 80 has a start button 82 which starts the automatic popping process, which will be detailed below. The control panel 80 also has a kettle heat button 86 having an LED (light emitting diode) 88 to indicate when the heating elements 40 in kettle 38 have been activated. The control panel 80 also has an agitator button 90 which has an operating indicating LED 92. The agitator button 90 starts and stops the motor 54 to rotate the agitator 56 in the kettle 38. The LED 92 is lit when the motor 54 is activated.

The control panel 80 also has an exhaust button 94 with a corresponding LED 94. The exhaust button 94 activates operation of the exhaust blower 66 and LED 96 indicates that the exhaust blower 66 is on. The control panel 80 also has a preheat oil button 98 with a corresponding LED 100. The preheat oil button 98 activates the heating rod 65 in the oil container 62 to heat the oil for a period of time sufficient to liquify the oil, usually 30 minutes. Holding the preheat oil button down for three seconds will activate the oil pump 60 to inject oil into the kettle 38. The LED 100 indicates that the oil is being preheated in the oil container 62. The control panel 80 also has a conditioner button 102 with an LED 104. The conditioner button 102 activates the blower 32 and the heating element 34 to keep the popcorn warm in the popcorn case 12. The LED 104 is lit when the conditioner 30 is turned on. Finally, a light button 106 with LED 108 is mounted on the control panel 80. The light button 108 activates the light 70 in the popcorn case 12.

Figure 4B:
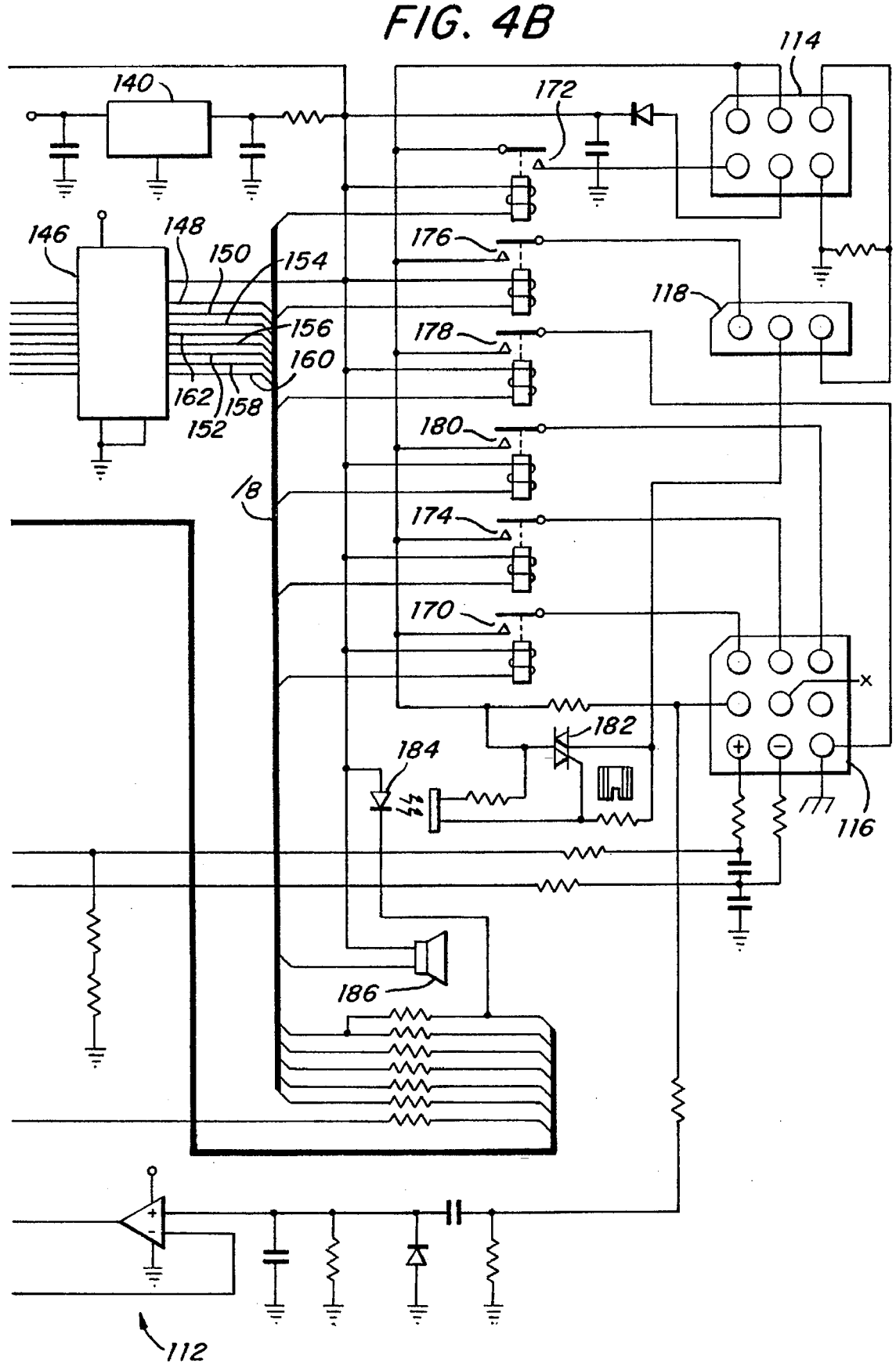

The printed circuit board 112 controls the popping sequence by having electronic components which are connected to the control panel 80. These electronic components integrate all controls and timers in the popcorn machine 10 into one control. FIG. 4 is a circuit diagram showing the components mounted on printed circuit board 112. The 12 volt AC source is coupled to a voltage regulator 140 which produces a DC voltage source to power the solid state components mounted on the printed circuit board 112. A processor 142 is programmed with the popping sequence which is activated when the start button 82 is pushed. The processor 142 is an Intel 87C750 type microcontroller which is connected to an oscillator clock 144. However, any suitable solid state microprocessor or solid state microcontroller may be used for processor 142.

The outputs of the processor 142 are coupled to a buffer chip 146 which amplifies the output signals to the various machine components via control lines. Specifically these control lines include a pre-heat oil control line 148, a lights control line 150, a conditioner control line 152, an alarm line 162, a kettle heat line 154, an oil pump line 156, an exhaust control line 158, and an agitator control line 160. Alarm control line 160 is also controlled by the processor 142.

The control lines 150-160 are connected respectively, to a light relay 170, a conditioner relay 172, a kettle heat relay 174, an oil pump relay 176, an exhaust relay 178 and an agitator relay 180. The relays 170-180 are wire coils which are wrapped around magnetic cores. When a signal is sent on one of the control lines 158-170 the coils create a magnetic force on the respective magnetic core. The magnetic force causes the 120 volt source or the 12 volt source to be connected to the respective power lines 122-134 thus powering the device. The control lines 150-160 are also coupled through resistors to LEDs 92, 96, 100, 104 and 108 which as previously described are lit when their respective devices are activated by sending signals through the respective control lines.

The pre-heat oil control line 148 is coupled to an optical coupler 184 which serves to isolate the pre-heat oil line 134 from the electronic components on the printed circuit board 112. The optical coupler 184 is coupled to a triac circuit 182 which cycles the voltage source on and off to the heating rod 65 in the oil container 62 to liquify the oil and keep it at proper temperature. The alarm line 162 is coupled to an audio alarm 186 which may be triggered by the processor 142, depending on certain conditions such as kettle overheating.

A temperature regulation circuit 188 is provided to enable temperature control for the kettle 38. The temperature regulation circuit 188 allows a user to set the regulation temperature according to a set of five DIP switches 190 which are coupled to a series of five resistors 192, 194, 196, 198 and 200. The resistors 192–200 are coupled to one input of an operational amplifier 202 which is configured as an adder circuit. The other input of the operational amplifier 202 is coupled to a resistor 204 whose value represents a fixed temperature. Each of the five DIP switches 190 when closed adds a resistor value representing a temperature to the resistor 204 representing the fixed temperature to produce a signal from the operational amplifier 202 representing a regulation temperature. In the preferred embodiment the temperature regulation circuit 188 may produce a regulation temperature range from 280–435 degrees Fahrenheit. Resistor 192 represents an addition of 80 degrees, resistor 194 represents an addition of 40 degrees, resistor 196 represents an addition of 20 degrees, resistor 198 represents an addition of 10 degrees and resistor 200 represents an addition of 5 degrees. Of course different temperature ranges may be used for the regulation voltage by using different resistor values for resistors 192–202.

The output of the regulation voltage circuit 188 is coupled to the inputs of comparators 204 and 206. The comparator 204 compares the regulation voltage temperature represented by the output signal of the regulation voltage circuit 188 to the temperature of the kettle 38 detected by the thermocouple 42 through a thermocouple circuit 208. The output of comparator 204 is then coupled through a selector 210 to the inputs of processor 142. Thus the comparator 204 is triggered when the kettle temperature sensed on thermocouple 42 exceeds the set regulation temperature.

The two inputs from the thermocouple 142 which represent the temperature of the kettle 38 are amplified by amplifier 212. The signal is modified to compensate for temperature drift from the printed circuit board 112 by means of a variable resistor 214 coupled through an operational amplifier 216. The signal is buffered using an amplifier 218 and coupled to the input of comparator 204. The output signal of the thermocouple circuit 208 is also coupled to a thermal warning circuit 220 which subtracts a voltage value representing a threshold voltage, in the preferred embodiment 48 degrees, from the signal representing the kettle voltage. The output of the thermal warning circuit 220 is then coupled to one input of the comparator 206.

The comparator 206 produces an output signal when the temperature of the kettle 38 exceeds the regulation temperature by 48 degrees. Obviously, different safety temperatures other than 48 degrees may be used by adjusting the resistor values in the thermal warning circuit 220. The output of the comparator 206 is then connected to the inputs of the processor 142 to indicate that the kettle temperature has greatly exceeded the regulation temperature.

The processor 142 has a number of timer inputs 222 which determine the amount of time that oil is injected into the kettle 38 by the oil pump 60. The time the pump is activated is set by means of a multiplexor chip 224 which may be set by a series of DIP switches 226. Each DIP switch 226 represents a certain time increment which may be added to the time the oil is pumped into the kettle 38.

The functioning of the popper control unit 36 will now be described with reference to FIGS. 1–4. The user places sufficient corn kernels in the kettle 38. The user also insures that the oil in the oil container 62 is in a liquid form. In order to activate a complete popping cycle, the user depresses the start button 82 on the control panel 80. The processor 142 then activates the oil pump 60, the heating elements 40 of the kettle 38, the agitator 56, and the exhaust blower 66 simultaneously.

The processor 142 activates the oil pump 62 by sending a signal along the oil pump control line 156. This signal turns on power from the oil power line 132 to the oil pump 60 via the oil pump relay 176. The processor 142 maintains the signal on the oil pump control line 132 for the time period set by the user. The oil pump 60 thus injects oil into the kettle 38 for a period of time set by the user via DIP switches 226.

Simultaneously with activating the oil pump 60, the processor 142 sends a signal along the kettle heat control line 154 which activates power to the heating element 40 in the kettle 38 via the kettle heat relay 174. The processor 142 is programmed to shut off the kettle heat by cutting the signal sent over the kettle heat control line 154 and thus removing power from the kettle heating elements 40. The kettle heat is shut down by the processor 142 ten minutes after the start button 82 is pressed, or 2 minutes after kettle operating temperature is reached, whichever is sooner. Of course, other times may be programmed depending on the user's preferences or other considerations. As already noted, the processor 142 is also programmed to shut off power to the kettle heating elements 40 after the regulation temperature is reached. The processor 142 thus monitors the outputs from the comparator 204 to determine whether the regulation temperature has been reached by the kettle 38.

The signal on the agitator control line 160 activates the motor 54 to rotate the agitator 56 to stir the corn in the kettle 38. After the kettle heat is automatically shut off, the processor will continue to send the signal on the agitator control line 160 for 15 minutes or another specified time. The processor 142 then shuts off the motor 54 via the agitator control line 160.

The processor 142 activates the exhaust blower 66 by sending a signal on the exhaust control line 158. The processor 142 keeps the exhaust blower 66 on for a set time after the agitator 56 is shut down. After the set period of time, the processor 142 shuts down the exhaust blower 66 thus ending the popping cycle. During the auto cycle operation, the LED 88 on the kettle heat button 56 will begin to flash during the last 2 minutes of the cycle indicating to the user that 2 minutes or less remain in the heat cycle or that the regulation temperature has been reached by the kettle 38.

The pre-heat oil button 98 allows a user to liquify the solid oil in the oil container 62 before activating the popping cycle described above. The oil in the container 62 is heated for a 30 minute maximum in the preferred embodiment, after which time the processor 142 will then shut off power to the heating rod 65. The kettle heat function is disabled if the pre-heat oil button 98 is pressed. The oil pump 60 may be set for two modes of heat which are controlled by the processor 142. The first mode heats the oil in oil container 62 for 20 minutes at full power to the heating rod 65 and then powers the heating rod 65 at a 5% to 10% duty cycle according to the control of the triac circuit 182 for ten additional minutes. A second mode allows the oil in the oil container 62 to he heated at full power for the entire period.

A number of safety features are built into the programming for the processor 142. The processor 142 continually senses the kettle temperature via the thermocouple 42. If the kettle temperature reaches 48 degrees above the set reference point, the processor sends a signal along the alarm control line 162 to activate the audio alarm 186. The processor also shuts off all the other devices except for the exhaust blower 66. The processor 142 activates the exhaust blower 66 and maintains power to the blower 66 until power is removed from the entire machine 10 or the comparator 206 determines that the kettle temperature sensed by the thermocouple 42 has dropped below the threshold temperature. If the kettle heat reaches the regulation temperature, the heating element 40 will be powered down and the kettle temperature will be regulated at the regulation temperature.

The control unit 36 of the present invention may also be modified to be used with older popcorn machines having a thermostat control. The thermostat line 130 may be connected to a thermostat. The selector 210 is then switched to provide the comparators 204 and 206 input from the thermostat line 130 instead of the thermocouple circuit 208.

Depressing the conditioner button 102, light button 106, and oil pump heat button 98 provide the user manual control to turn on or off the conditioner 30, light 70, and oil pump 60 respectively. Depressing the kettle heat button 86, agitator button 90 and exhaust button 94 provide the user manual control to turn on or off the heat to the kettle 38, the agitator 56 and the exhaust blower 66.

It will be understood that modifications and variations may be effected without departing from the spirit and scope of the novel concepts of this invention.

What is claimed is:

1. In combination with a popcorn machine including a case for holding popped corn, an electrically heated popcorn kettle located within the case, a corn agitator positioned within the kettle to stir corn during heating, means for exhausting air from the case and an oil pump operably connected to a source of popping oil to supply oil to the popcorn kettle, a machine operation system comprising:
    (a) electrical circuitry for connecting the kettle, agitator, exhaust means and oil pump to a source of electricity;
    (b) a microprocessor operably connected to the electrical circuitry to programably control operation of the kettle, agitator, exhaust means and oil pump during a cooking cycle;
    (c) manual override means coupled to the microprocessor and the kettle, agitator, exhaust means and oil pump for allowing a user to manually control the operation of the kettle, agitator, exhaust means and oil pump.

2. The machine operation system of claim 1 wherein said microprocessor is electrically coupled to relays to control operation of the kettle, agitator, exhaust means and oil pump during a cooking cycle.

3. The machine operation system of claim 1 wherein said microprocessor is programmed to sequentially heat the kettle for a set period of time, operate the agitator for a set period of time, operate the oil pump for a set period of time, and operate the exhaust means for a set period of time.

4. The machine operation system of claim 1 further comprising:
    a heat sensing means coupled to the kettle to sense the heat of the kettle;
    a temperature regulation circuit having an input coupled to said heat sensing means, the temperature regulation circuit having an output which is coupled to said microprocessor to indicate that the heat of the kettle has exceeded a set regulation temperature.

5. The machine operation system of claim 4 wherein said heat sensing means is a thermocouple.

6. The machine operation system of claim 4 wherein said heat sensing means is a thermostat.

7. The machine operation system of claim 4 further comprising a means to set the regulation temperature.

8. In combination with a popcorn machine including a case for holding popped corn, an electrically heated popcorn kettle located within the case, a corn agitator positioned within the kettle to stir corn during heating, means for exhausting air from the case and an oil pump operably connected to a source of popping oil to supply oil to the popcorn kettle, a machine operation system comprising:
    (a) electrical circuitry for connecting the kettle, agitator, exhaust means and oil pump to a source of electricity;
    (b) a microprocessor operably connected to the electrical circuitry to programmably control operation of the kettle, agitator, exhaust means and oil pump during a cooking cycle;
    (c) a heat sensing means coupled to the kettle to sense the heat of the kettle;
    (d) a warning circuit having an input coupled to said heat sensing means, the warning circuit sending a signal through an output indicating that the heat of the kettle has exceeded a set regulation temperature by an alarm threshold temperature; and
    (e) an alarm coupled to said microprocessor and for activation when said warning circuit sends a signal through said output.

9. The machine operation system of claim 8 wherein said alarm is an audio alarm.

10. The machine operation system of claim 8 wherein said heat sensing means is a thermocouple.

11. The machine operation system of claim 8 wherein said warning circuit includes a comparator having an input coupled to said heat sensing means and a second input coupled to a voltage source representing said alarm threshold temperature.

12. The machine operation system of claim 8 wherein the microprocessor interrupts the flow of power from the source of electricity to the kettle, agitator and oil pump, when the warning circuit sends a signal indicating that the heat of the kettle has exceeded the set regulation temperature by the alarm threshold temperature.

13. The machine operation system of claim 3 wherein the microprocessor interrupts the flow of power from the source of electricity a preselected period of time after initiation of power or a preselected period of time after the heat of the kettle has reached the set regulation temperature, whichever is sooner.

14. The machine operation system of claim 8 wherein the microprocessor activates the flow of power from the source of electricity to the kettle for a selected period of time.

15. The machine operation system of claim 8 wherein the microprocessor interrupts the flow of power from the source of electricity to the kettle a preselected period of time after initiation of power or a preselected period of time after the heat of the kettle has reached the set regulation temperature, whichever is sooner.

* * * * *